(12) United States Patent
Cavaliere et al.

(10) Patent No.: US 11,128,395 B2
(45) Date of Patent: Sep. 21, 2021

(54) RECEIVING AN OPTICAL SIGNAL

(71) Applicant: Telefonaktiebolaget LM Ericsson (publ), Stockholm (SE)

(72) Inventors: Fabio Cavaliere, Pisa (IT); Paola Iovanna, Pisa (IT)

(73) Assignee: Telefonaktiebolaget LM Ericsson (PubL), Stockholm (SE)

(*) Notice: Subject to any disclaimer, the term of this patent is extended or adjusted under 35 U.S.C. 154(b) by 0 days.

(21) Appl. No.: 16/762,305

(22) PCT Filed: Nov. 14, 2017

(86) PCT No.: PCT/EP2017/079194
§ 371 (c)(1),
(2) Date: May 7, 2020

(87) PCT Pub. No.: WO2019/096371
PCT Pub. Date: May 23, 2019

(65) Prior Publication Data
US 2021/0044376 A1 Feb. 11, 2021

(51) Int. Cl.
*H04J 14/08* (2006.01)
*H04B 10/564* (2013.01)
*H04B 10/60* (2013.01)

(52) U.S. Cl.
CPC ............ *H04J 14/08* (2013.01); *H04B 10/564* (2013.01); *H04B 10/60* (2013.01)

(58) Field of Classification Search
None
See application file for complete search history.

(56) References Cited

U.S. PATENT DOCUMENTS

| | | | | |
|---|---|---|---|---|
| 5,581,387 A | * | 12/1996 | Cahill | H04J 14/08 398/1 |
| 2007/0274339 A1 | * | 11/2007 | Kim | H04L 47/15 370/468 |
| 2008/0304823 A1 | * | 12/2008 | Mahony | H04Q 11/0067 398/13 |
| 2009/0285581 A1 | | 11/2009 | Kim et al. | |

(Continued)

FOREIGN PATENT DOCUMENTS

| JP | 2009021874 A | 1/2009 |
|---|---|---|
| WO | 2018171879 A1 | 9/2018 |

OTHER PUBLICATIONS

International Search Report and Written Opinion dated Jul. 19, 2018 for International Application No. PCT/EP2017/079194 filed on Nov. 14, 2017, consisting of 9-pages.

*Primary Examiner* — Darren E Wolf
(74) *Attorney, Agent, or Firm* — Christopher & Weisberg. P.A.

(57) ABSTRACT

Methods and apparatus are provided for receiving an optical signal. In one aspect, a method includes receiving a first optical signal comprising time division multiplexed transmissions from a plurality of optical transmitters, and determining that a transmission is not received during a time period from a first optical transmitter of the optical transmitters that is scheduled to transmit during the time period. A second optical signal is inserted into the first optical signal during the time period, the second optical signal having at least a non-zero power portion.

18 Claims, 6 Drawing Sheets

(56) References Cited

U.S. PATENT DOCUMENTS

| | | | |
|---|---|---|---|
| 2010/0239253 A1* | 9/2010 | Lin | H04J 14/0252 398/63 |
| 2010/0239256 A1* | 9/2010 | Zheng | H04B 10/25754 398/66 |
| 2011/0078755 A1* | 3/2011 | Dai | H04J 14/0232 725/111 |
| 2012/0176667 A1* | 7/2012 | He | H04B 10/2942 359/344 |
| 2013/0004156 A1* | 1/2013 | Yang | H04Q 11/0067 398/17 |
| 2014/0219651 A1* | 8/2014 | Ruffini | H04B 10/0775 398/33 |
| 2015/0229397 A1* | 8/2015 | Shibata | H04B 10/25753 398/115 |

* cited by examiner

RECEIVING AN OPTICAL SIGNAL

CROSS-REFERENCE TO RELATED APPLICATIONS

This application is a Submission Under 35 U.S.C. § 371 for U.S. National Stage Patent Application of International Application Number: PCT/EP2017/079194, filed Nov. 14, 2017 entitled "RECEIVING AN OPTICAL SIGNAL," the entirety of which is incorporated herein by reference.

TECHNICAL FIELD

Examples of the present disclosure relate to methods and apparatus for receiving an optical signal, such as for example in an optical communications network.

BACKGROUND

Passive optical networks (PONs) can be used to provide access to a network for a plurality of premises. For example, a passive optical network may be used to connect a plurality of residential and/or commercial premises to the internet.

All PON implementation variants adopt a time division multiplexing (TDM) mechanism. Downstream, for example from a network to the premises served by the PON, a constant bit rate signal is broadcast from an optical line terminal (OLT) to optical network terminations (ONTs) associated with the premises. Time slots in the signal frame are assigned to each ONT so that each ONT can receive communications in its time slot and ignore the other ones.

Upstream, TDM is also used but the ONTs need to be coordinated by the OLT, which assigns to them a time window in which they are allowed to transmit. The assignment process is known as dynamic bandwidth assignment (DBA). A busty upstream signal is a potential cause of severe degradation of the reception quality of a transported signal.

SUMMARY

One aspect of the present disclosure provides a method of receiving an optical signal. The method comprises receiving a first optical signal comprising time division multiplexed transmissions from a plurality of optical transmitters, and determining that a transmission is not received during a time period from a first optical transmitter of the optical transmitters that is scheduled to transmit during the time period. A second optical signal is inserted into the first optical signal during the time period, the second optical signal comprising at least a non-zero power portion.

Optionally, the method comprises allocating a respective time slot for each of the optical transmitters. Receiving a first optical signal comprises receiving a transmission from each of the optical transmitters in its respective time slot, and wherein the time period comprises a time slot of one of the first optical transmitters.

Optionally, the first optical transmitter is associated with a base station or a remote radio unit, and allocating a respective time slot for each of the optical transmitters comprises allocating a time slot for the first optical transmitter based on timing information for signals transmitted or received by the base station or remote radio unit, and/or signals to be transmitted and/or to be received by the base station or remote radio unit.

Optionally, the first optical transmitter is associated with a base station or a remote radio unit, and allocating a respective time slot for each of the optical transmitters comprises allocating at least a minimum number of time slots to the first optical transmitter during each recurring time period; allocating at least a minimum bandwidth to the first optical transmitter during each recurring time period; and/or allocating at least one or more predetermined time slots to the first optical transmitter during each recurring time period.

Optionally, determining a respective received power level of each of the transmissions from each of the optical transmitters; and sending a signal to at least one of the optical transmitters to modify its transmission power such that the received power levels of transmissions received from the optical transmitters are within a predetermined range.

Optionally, the predetermined range is an absolute received power level range or is relative to the received power level of transmissions from one of the optical transmitters.

Optionally, sending a signal to at least one of the optical transmitters to modify its transmission power comprises sending the signal such that the received power levels of transmissions received from the optical transmitters are substantially identical.

Optionally, controlling the output power of the second optical signal to be within the predetermined range.

Optionally, determining that a transmission is not received during a time period from the first optical transmitter comprises listening for a preamble from the first optical transmitter during the time period, and determining that a transmission is not received if the preamble is not detected.

Optionally, the second optical signal is a variable optical signal corresponding to a predetermined bit pattern.

Optionally, stopping inserting the second optical signal into the first optical signal at the end of the time period.

Optionally, an end portion of the second optical signal during the time period comprises a portion of zero power over a plurality of symbol periods.

Optionally, inserting the second optical signal into the first optical signal comprises generating the second optical signal; and switching the second optical signal into the first optical signal during the time period.

Optionally, providing the first optical signal to a demodulation apparatus.

Another aspect of the present disclosure provides apparatus for receiving an optical signal, the apparatus comprising a processor and a memory. The memory containing instructions executable by the processor such that the apparatus is operable to receive a first optical signal comprising time division multiplexed transmissions from a plurality of optical transmitters, determine that a transmission is not received during a time period from a first optical transmitter of the optical transmitters that is scheduled to transmit during the time period, and insert a second optical signal into the first optical signal during the time period, the second optical signal comprising at least a non-zero power portion.

A further aspect of the present disclosure provides apparatus for receiving an optical signal. The apparatus comprises a receiving module configured to receive a first optical signal comprising time division multiplexed transmissions from a plurality of optical transmitters, a determining module configured to determine that a transmission is not received during a time period from a first optical transmitter of the optical transmitters that is scheduled to transmit during the time period, and an insertion module configured to insert a second optical signal into the first optical signal during the time period, the second optical signal comprising at least a non-zero power portion.

A further aspect of the present disclosure provides a computer program comprising instructions which, when executed on at least one processor, cause the at least one processor to carry out a method according to any example.

A further aspect of the present disclosure provides carrier containing a computer program according to any example, wherein the carrier comprises one of an electronic signal, optical signal, radio signal or computer readable storage medium.

A further aspect of the present disclosure provides a computer program product comprising non transitory computer readable media having stored thereon a computer program according to any example.

BRIEF DESCRIPTION OF THE DRAWINGS

For a better understanding of examples of the present disclosure, and to show more clearly how the examples may be carried into effect, reference will now be made, by way of example only, to the following drawings in which.

DETAILED DESCRIPTION

The following sets forth specific details, such as particular embodiments or examples for purposes of explanation and not limitation. It will be appreciated by one skilled in the art that other examples may be employed apart from these specific details. In some instances, detailed descriptions of well-known methods, nodes, interfaces, circuits, and devices are omitted so as not obscure the description with unnecessary detail. Those skilled in the art will appreciate that the functions described may be implemented in one or more nodes using hardware circuitry (e.g., analog and/or discrete logic gates interconnected to perform a specialized function, ASICs, PLAs, etc.) and/or using software programs and data in conjunction with one or more digital microprocessors or general purpose computers. Nodes that communicate using the air interface also have suitable radio communications circuitry. Moreover, where appropriate the technology can additionally be considered to be embodied entirely within any form of computer-readable memory, such as solid-state memory, magnetic disk, or optical disk containing an appropriate set of computer instructions that would cause a processor to carry out the techniques described herein.

Hardware implementation may include or encompass, without limitation, digital signal processor (DSP) hardware, a reduced instruction set processor, hardware (e.g., digital or analogue) circuitry including but not limited to application specific integrated circuit(s) (ASIC) and/or field programmable gate array(s) (FPGA(s)), and (where appropriate) state machines capable of performing such functions.

Figure 1:
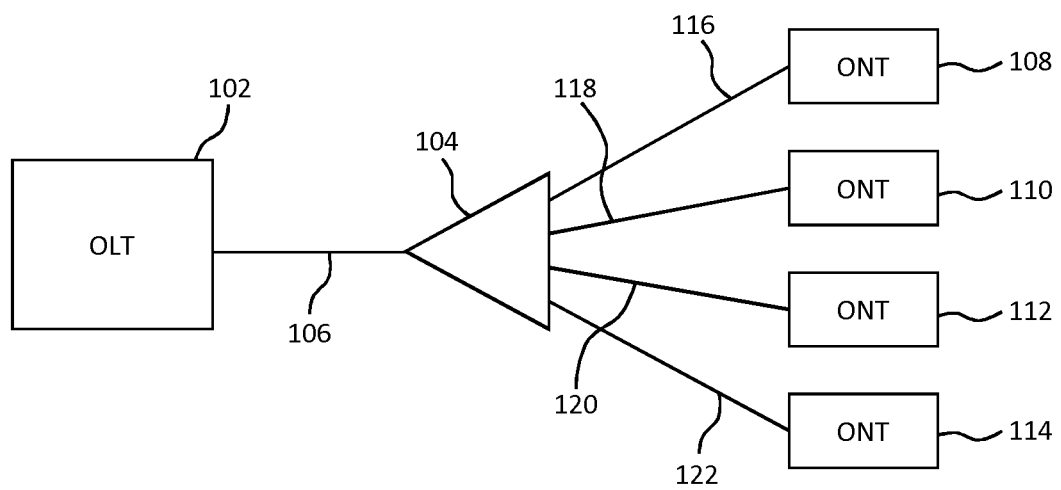
FIG. 1 is a schematic illustration of an example of a passive optical network.

FIG. 1 shows an example of a passive optical network (PON) 100. The PON 100 includes an optical line terminal (OLT) 102 that is connected to a passive splitter 104 via an optical fibre 106. The PON 100 also includes four optical network terminations (ONTs) 108, 110, 112 and 114 (alternatively these may be referred to as optical network terminals or optical network elements), connected to the splitter 104 via optical fibres 116, 118, 120 and 122 respectively.

The splitter 104 is a passive component that splits an optical signal from the OLT 102 (i.e. the downstream signal) and directs it into all of the optical fibres 116, 118, 120 and 122. The splitter 104 also directs optical signals from any of the fibres 116, 118, 120 and 122 (i.e. upstream signals) into the fibre 106 towards the OLT 102. In some examples, upstream and downstream signals may be wave division multiplexed (WDM). That is, upstream signals use one wavelength and downstream signals use another wavelength. In this case, downstream signals to the ONTs 108, 110, 112 and 114 are time division multiplexed (TDM), and upstream signals are also time division multiplexed.

In some examples, the OLT 102 controls the time division multiplexing. For downstream signals from the OLT 102 to the ONTs 108-114, each frame transmitted by the OLT includes an indication (e.g. address) of the destination ONT. As such, all the ONTs receive all frames, but the ONTs for which a frame is not intended can ignore the frame. Upstream signals may be time division multiplexed in any suitable manner, such as for example a round robin approach between the ONTs, or the time slots assigned to each ONT may be actively managed by the OLT 102.

A single ONT 108-114 to which an upstream time slot is assigned transmits a signal to the OLT 102 during each time slot, or the ONT may choose not to transmit, for example if it has no data to transmit. There may also be varying lengths of optical fibre 116-122 between the splitter 104 and each of the ONTs 108-114, and thus a varying distance between the OLT 102 and each of the ONTs 108-114, leading to varying levels of attenuation of signals from the ONTs depending on which ONT is transmitting. As a result, the upstream signals from the ONTs 108-114 received at the OLT 102 can be very uneven.

Figure 2:
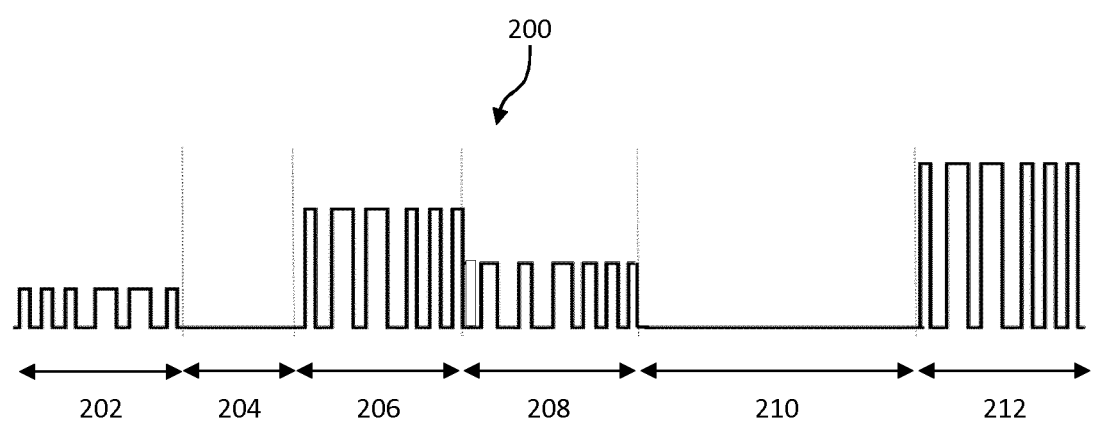
FIG. 2 illustrates an example of a portion of an optical signal.

FIG. 2 shows an example of a portion of upstream signals 200 received at the OLT 102 in six time slots 202, 204, 206, 208, 210 and 212. In the first time slot 202, a first ONT (such as for example ONT 108) transmits a signal that is received by the OLT 102. The transmitted signal may be modulated by a sequence of bits using a coding scheme such as amplitude modulation, NRZ, RZ or Manchester coding. The OLT is arranged to receive signals from ONT using time division multiplexing, TDM, i.e. TDM access, TDMA. One or more time slots may be allocated to ONTs in communication with the OLT. The signal intensity varies in a substantially binary manner between a first amplitude and zero. There may also be noise and/or interference, not shown in FIG. 2.

In the second time slot 204, no signal is received from an ONT (such as for example ONT 110), and the signal amplitude remains at zero. As noted above, this may be because the ONT to which time slot 204 was assigned (for example by the OLT 102) has not transmitted a signal. This is an example of a silent period. An ONT is allowed to transmit by the OLT but not obliged to do so, meaning that silent periods occur where no power is received by the OLT.

In the third time slot 206, a signal is received (such as for example from ONT 112) with a higher amplitude than in the first time slot 202.

In the next time slot 208, a signal is received with an amplitude between that of the signals in time slots 202 and 206. In time slot 210, again no signal is received, and in time slot 212 a signal is received with an amplitude that is even higher. In some examples, the ONTs transmit signals to the OLT 102 with substantially the same signal power (e.g. light intensity) or amplitude, and therefore any differences in signal amplitudes as received by the OLT are as a result of differences in total length of fibre to each of the ONTs.

The variation in signal amplitude and the silent periods (e.g. time slots 204 and 206 shown in FIG. 2) can cause problems at the OLT. For example, variable gain amplifiers (not shown) in the OLT 102 may be adjusted frequently, such as for example at the initial portions of each time slot, to account for the variable received signal amplitude or the silent, and this may cause initial portions to be interpreted incorrectly. Furthermore, noise may be misinterpreted as data bits. Additionally or alternatively, synchronization between the OLT and one or more ONTs may be lost, such as for example when self-clocking signals are used, during silent periods or when incoming signals misinterpreted due to an incorrect variable gain amplifier setting.

Figure 3:
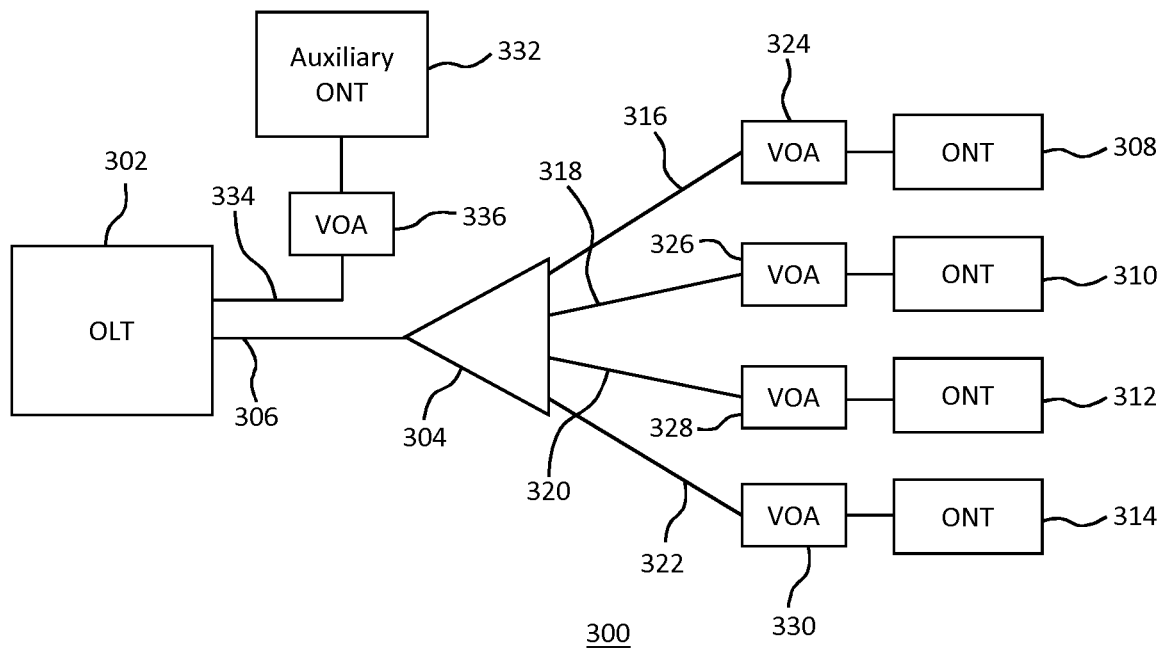
FIG. 3 is a schematic illustration of another example of a passive optical network.

FIG. 3 shows an example of a passive optical network (PON) 300 according to an embodiment of this disclosure. The PON 300 comprises an OLT 302 connected to a passive splitter 304 via a fibre 306. The splitter 304 is connected to ONTs 308, 310, 312 and 314 via fibres 316, 318, 320 and 322 respectively. A variable optical amplifier (VOA) 324, 326, 328 and 330 is associated with each ONT 308, 310, 312 and 314 respectively.

The PON 300 also includes an auxiliary ONT 332 and an associated VOA 336 connected to the OLT 302 via an optical fibre 334. The auxiliary ONT and VOA 336 are in some examples local to the OLT 302, but may be located anywhere in the PON 300 in other examples and hence signals from the auxiliary ONT 332 may or may not be received through one or more optical splitters such as splitter 304. In some aspects, the auxiliary ONT 332 may be considered as a part of the OLT 302. In some aspects, the auxiliary ONT is modulated by a known bit sequence.

In some examples, the variable optical amplifiers (VOAs) amplify or attenuate an optical signal transmitted from an associated ONT in response to a control signal. In other examples, however, the VOAs may instead be amplifiers or other control mechanisms associated with the ONTs to vary the amplitude of signals transmitted from the ONTs.

In still further examples, one, some or all of the VOAs 324-330 and 336 or other amplitude control systems may be absent. The PON 400 shown in FIG. 4, for example, includes many components from the PON 300 of FIG. 3, which are given the same reference numerals, but the VOAs are not present.

In some examples, the variable optical attenuators (VOAs) are adjusted so that the received power levels from all ONTs are substantially equal for all the ONTs. For example, the following calibration procedure may be used:

1. For each kth ONT, the OLT measures the power $P_k$ received from the kth ONT when all the other ONTs are silent.
2. The OLT calculates the VOAs attenuation value required based on $P_k - \min\{P_k\}$, where $\min\{P_k\}$ is the minimum $P_k$ for all values of k;
3. The attenuation values are communicated downstream by the OLT to the VOAs. For example, each VOA receives its respective attenuation value.

Figure 4:
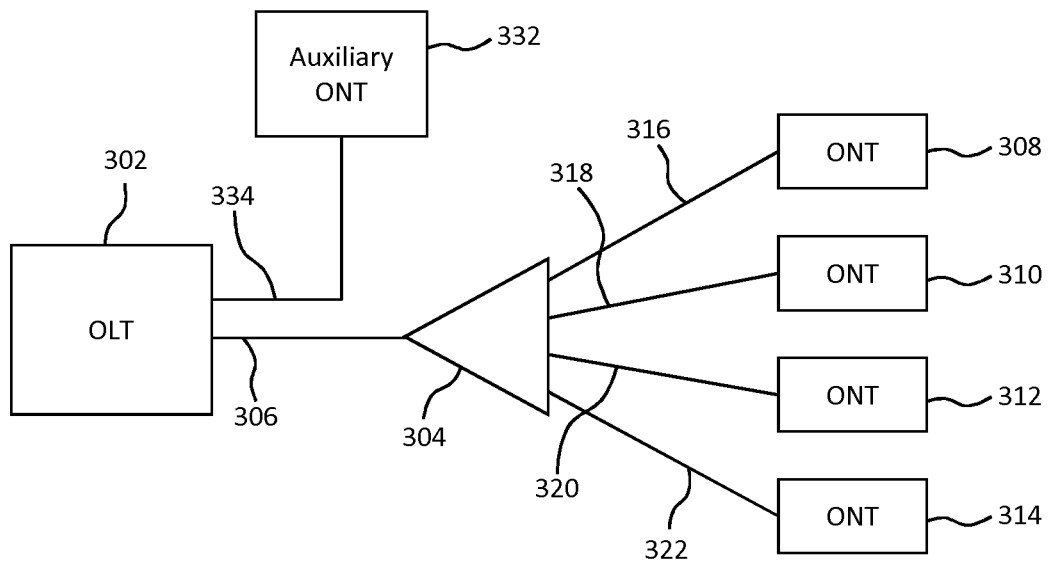
FIG. 4 is a schematic illustration of a further example of a passive optical network.

In the example PONs 300 and 400 shown in FIGS. 3 and 4, a single passive optical splitter 304 is shown between the OLT 302 and four ONTs 308-314. This is merely an example, however, and in other examples there may be more optical splitters in the network or different means may be used to combine the signals from the ONTs. For example, signals between the OLT from some or all of the ONTs may pass through two or more optical splitters, and each optical splitter may be connected to one or more optical splitters and/or any number of ONTs.

In some examples, the OLT comprises a photodetector to detect the received optical signal. Photodetectors which able to deal with fast changes of received power and to fast recover clock and frame synchronization after a silent period are known as burst receivers. Burst receivers are not available at 25 Gbit/s, which is a bit rate which may be used for a radio access network communication, e.g. for a fronthaul interfaces in 5G (New Radio). The present disclosure avoids the reception of silent periods, and so provides for improved receiver operation e.g. to recover clock and frame synchronization or to avoid or reduce received power changes. In some examples, the OLT receives a single optical channel, i.e. at a single wavelength. The examples of the present disclosure avoid the need for scheduling policies to avoid silent periods or the use of wavelength division multiplexing.

Figure 5:
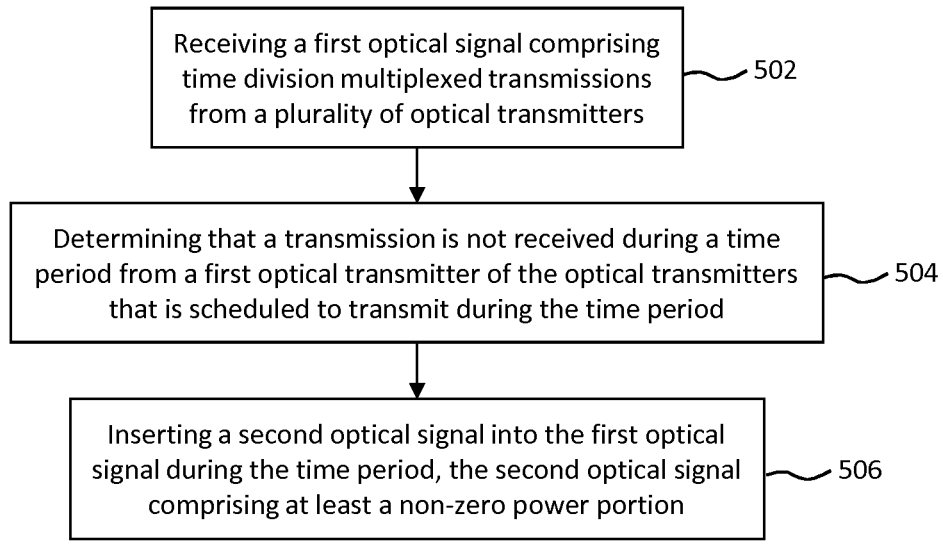
FIG. 5 is a flow chart of an example of a method of receiving an optical signal.

FIG. 5 shows a method of receiving an optical signal. The method may be carried out, for example, by the OLT 302 of FIGS. 3 and 4. In a first step 502, the method comprises receiving a first optical signal comprising time division multiplexed transmissions from a plurality of optical transmitters. The optical transmitters may comprise or be associated with ONTs, such as for example ONTs 308-314. Time slots in which each of the transmitters transmit their signals may be chosen in any suitable manner, such as for example in a round robin fashion or assigned in a fixed or dynamic manner by the OLT 302. The time period may comprise one of the time slots.

In step 504, the method 500 also comprises determining that a transmission is not received during a time period from a first optical transmitter of the optical transmitters that is scheduled to transmit during the time period. For example, the first optical transmitter, which is due to transmit during the time period, does not do so, for example because it has no data to transmit. The determination may be done in any suitable manner. For example, the received power of the optical signal may be measured over an initial portion of the time period, or a preamble may be listened for. If the received power is zero or below a threshold value (to account for noise), or if the preamble is not found, then it may be concluded that the first transmitter is not transmitting during the time period.

Following this determination, in step 506 the method 500 comprises inserting a second optical signal into the first optical signal during the time period, the second optical signal comprising at least a non-zero power portion. As such, the second optical signal has a non-zero power. In some examples, the non-zero power portion may allow a network element, such as an OLT for example, to perform more effective power control (e.g. variable gain amplification) of the received signal than if the time period were a "silent" period with no signal received. This may avoid certain problems, such as for example misinterpreting noise as a signal, and/or misinterpreting a signal in a later time slot. Additionally or alternatively, the second optical signal may allow the OLT to maintain synchronization, such as for example if the non-zero portion is at a predetermined time point in the time period or if the second optical signal includes a bit sequence or other varying signal. In this case, for example, the second optical signal may be synchronized with transmissions from the optical transmitters.

Figure 6:
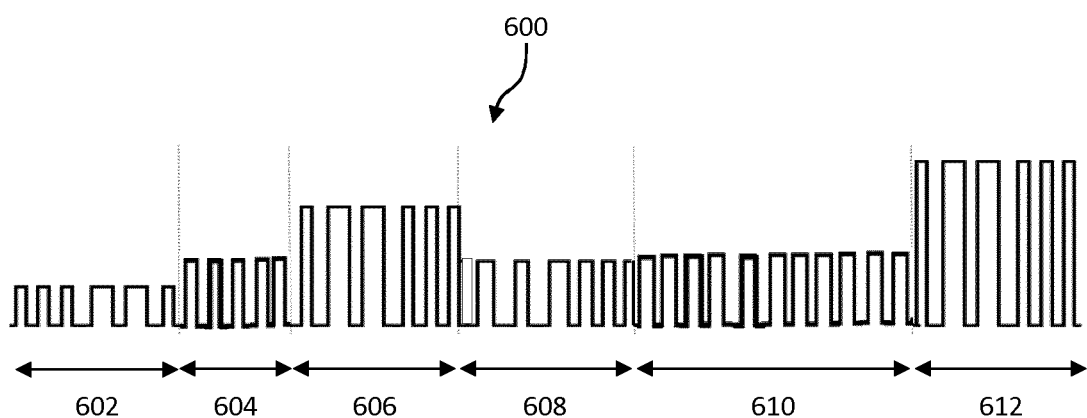
FIG. 6 illustrates an example of a portion of another optical signal.

FIG. 6 shows an example of a portion of a signal 600 following insertion of a second optical signal, and therefore may be a signal as seen by a receiver, such as for example an optical receiver in an OLT. The signal 600 includes time slots 602, 604, 606, 608, 610 and 612 and may be the result of inserting second optical signals into the signal 200 shown in FIG. 2. Therefore, for example, the time slots 602, 606, 608 and 612 correspond to the time slots 202, 206, 208 and 212 and comprise signals from optical transmitters such as ONTs. Time slots 604 and 610 correspond to the silent periods 204 and 210, though as shown in FIG. 6 the signal 604 includes signals in these time slots that have been inserted into the signal 600. As a result, there are no silent periods as seen by a receiver of the optical signal 600. The inserted signals are the second optical signal having a non-zero power. In some examples, the receiver or associated processing apparatus may be aware that the signal in certain time slots has been inserted and has not been transmitted by a transmitter, and hence the inserted signal is not mistaken for a signal transmitted by a transmitter such as an ONT 308-314 shown in FIGS. 3 and 4. Alternatively, in some examples, the inserted signal may be recognised as an inserted signal by the receiver or processing apparatus, for example the inserted signal may correspond to a predetermined bit pattern or contain information identifying it as an inserted signal. As can be seen in FIG. 6, the insertion of the second optical signal provides for the receiving to comprise no silent periods. Thus, an optical signal may be continuously received at the receiver. In some examples, due to the insertion of the second optical signal, the receiver may receive a constant bit rate optical signal, including the inserted portions.

The second optical signal may be generated by the auxiliary ONT 332, and inserted by the OLT 302, particularly if the auxiliary ONT 332 is local to the OLT 302. In other examples, the auxiliary ONT 332 may be located at another point in the network, or may be within one of the ONTs connected to the PON, such as ONTs 308-314 for example. Upon the determination that no signal is being received in a time period such as a time slot, the auxiliary ONT may begin to generate the second optical signal which is then inserted into the signal from the ONTs (although at that point the signal from the ONTs is a silent period). The auxiliary ONT may therefore be connected to the OLT in a passive manner, such as for example using a passive splitter/combiner within the OLT 302 or at another point in the network. Alternatively, the auxiliary ONT may continuously generate a signal to be inserted, and an active component such as an optical switch may be used to insert the signal, e.g. the signal provided to a receiver may be switched between the signal from the fibre 306 and the signal from the fibre 334. At the end of the time period, insertion of the second optical signal may be stopped, for example by causing the auxiliary ONT 332 to stop generating the signal or by switching the signal received at the receiver back to the signal from the fibre 306. By having the auxiliary ONT continuously generating the signal to be inserted, and selectively switching the signal into the OLT, there may be no "warm up time" for the auxiliary ONT to switch on and begin to transmit the signal to be inserted. For example, the auxiliary ONT may be always switched on, and connected by the switch only when a silent period is detected. This may allow the signal to be inserted in a short period of time. For example, when no power from an ONT is detected at the OLT for a given amount of time, the signal from the auxiliary ONT may be inserted such that it is received by the OLT. The given amount of time plus the amount of time to begin inserting the signal from the auxiliary ONT should in some examples be short enough not to cause loss of synchronization at the OLT, e.g. three bit time periods. Use of an optical switch and an auxiliary ONT continuously generating the signal to be inserted as illustrated above may allow the signal to be inserted quickly after detecting that an ONT is not transmitting in its time slot. In some aspects, the auxiliary ONT inserts an optical signal to the receiver of the OLT, i.e. similar to the optical signal expected (but not received) from a connected remote ONT.

In some examples, a portion (e.g. one or more symbol periods) of the optical signal at the end of the time period may be of zero power. In this case, if there is any overlap between insertion of the second optical signal and receipt of a subsequent signal from an optical transmitter in the next time slot, the inserted signal does not interfere with the subsequent signal for some or all of the overlap. Additionally or alternatively, a portion (e.g. one or more symbol periods) of the optical signal at the start of the time period may have zero power to avoid interference in the event of overlap. In this disclosure, a signal "zero power" could alternatively be a signal of low enough power so as not to interfere with another signal being transmitted simultaneously.

In some examples, one or more VOAs (or other amplitude adjusting apparatus) may be used such that the signal received by a receiver, such as a receiver in the OLT 302 for example, is at a substantially constant amplitude. For example, the power of signals transmitted by the ONTs may be adjusted such that the received signal has a constant or substantially constant amplitude (i.e. varies between two substantially constant power levels, one of which may be zero power), or has an amplitude within a predetermined range to account for noise or other minor variations. The OLT 302, or any other suitable entity, may for example determine (e.g., measure) a respective received power level of each of the transmissions from each of the optical transmitters, and send a signal to at least one of the optical transmitters to modify its transmission power such that the received power levels of transmissions received from the optical transmitters are within a predetermined range. As a result, the signal presented to a receiver may have a substantially constant average power.

Figure 7:
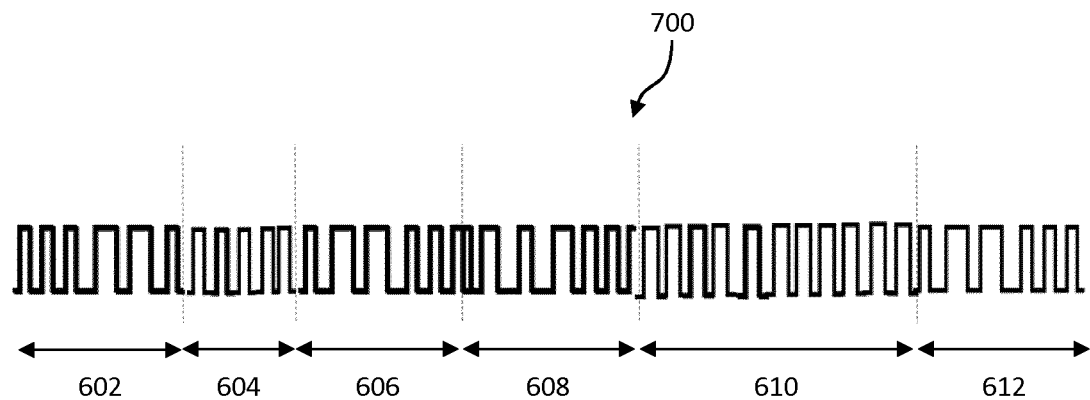
FIG. 7 illustrates an example of a portion of a further optical signal.

FIG. 7 shows a signal 700 comprising the signal from FIG. 6 in the time slots 602-612 which has been adjusted in this manner. The amplitude of the signals from each of the ONTs 308-312 may not change substantially over time, and therefore the adjustment of the signal power may be done during configuration of the POS and/or continuously or repeatedly over time.

In one example, the OLT 302 shown in FIG. 3 may measure the power of a signal received from ONT 308 in a time slot assigned to the ONT 308, where the signal received is not a silent period. As a result of the measurement, the OLT 302 may send a signal to the ONT to adjust the power of the transmitted signal, for example using its associated VOA 324. Subsequent transmissions received by the OLT 302 from the ONT 308 may then be received at a chosen signal power or amplitude, although in some examples further measurements may be made during subsequent transmissions from the ONT 308 to correct any difference between the adjusted power and the chosen power. The amplitude or power of signals received from the ONTs 310-314 and also the auxiliary ONT 332 may be adjusted in a similar manner, although in some cases where the auxiliary ONT 332 is local to the OLT 302, the auxiliary ONT may provide a signal to be inserted at the chosen power/amplitude level without requiring adjustment.

Figure 8:
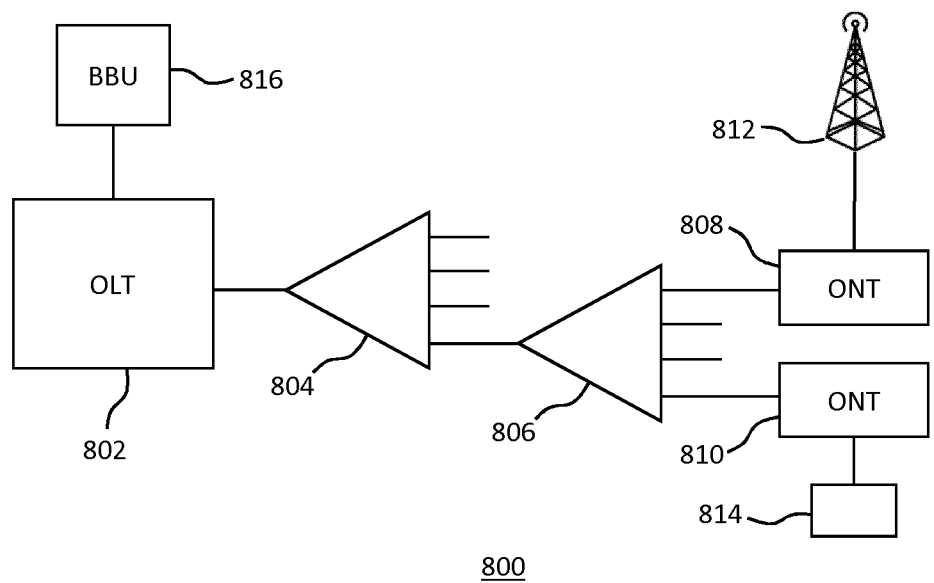
FIG. 8 is a schematic illustration of a still further example of a passive optical network.

In some networks, such as for example the passive optical network (PON) 800 shown in FIG. 8, the first optical transmitter (e.g. an ONT) is associated with a base station or a remote radio unit (RRU) of a radio access network. For a RRU, the first optical transmitter may be arranged to transmit radio data, e.g. digitized radio data, for example in a CPRI format, to a Baseband Unit (BBU) for baseband processing. The transmission may be considered as a fronthaul transmission. For a base station comprising baseband processing, the first transmitter may be arranged to transmit data, e.g. considered as a backhaul transmission. In some examples, the OLT may receive one or both of fronthaul and backhaul transmissions. In some aspects, a time slot may be assigned to the first optical transmitter based on timing information for signals transmitted or received by the base station or remote radio unit. The network 800 of FIG. 8 shows an OLT 802 connected to a first splitter 804, which is in turn connected to a second splitter 806. This is however merely an example of cascading splitters and is not a requirement of the network 800. The second splitter 806 is connected to ONTs 808 and 810. The ONT 808 is associated with a base station or remote radio unit (RRU), which transmits and receives signals over a cellular or radio access network to a wireless device, e.g. a user equipment (UE). The ONT 810 is associated with a user 814 such as fixed commercial or residential premises. The network may also include further ONTs (not shown).

In some examples, the system and OLT may receive transmissions from one or both of a fixed access system (e.g. a PON serving enterprise or residential fixed access internet connection) and a radio access network. In some examples, the OLT and one or more ONTs relate to a PON infrastructure.

In some examples, the OLT 802 is also in communication with a base band unit (BBU) 816. The BBU 816 determines (e.g. predicts or receives) communications to be sent by the base station or RRU 812, and may also determine signals that are expected to be received by the base station or RRU 812. In some cases, communications to be sent over a radio access network, i.e. sent or received by the base station or RRU 812, may have particular requirements regarding bandwidth, latency, timing and/or any other requirements.

Furthermore, unpredictability of latency of communications, e.g. when dynamic allocation of uplink or downlink time slots is performed, may negatively impact mobile network performance. Therefore, the OLT 802 may be arranged to take these requirements into account when assigning time slots for upstream and downstream communications between the OLT 802 and the ONTs 808 and 810 (and any other ONTs in the network 800).

For example, the OLT 802 (or any other suitable entity) may allocate at least a minimum number of uplink and/or downlink time slots to the first optical transmitter (e.g. the ONT 808) during each recurring time period. This ensures that communications between the base station or RRU 812 and the BBU 816 or backhaul network have a minimum bandwidth during each recurring time period. The recurring time period may be, for example, each TDM cycle containing all time slots. Additionally or alternatively, at least a minimum bandwidth may be allocated to the first optical transmitter during each recurring time period, without specifying particular time slots. Additionally or alternatively, at least one or more predetermined time slots may be allocated to the first optical transmitter during each recurring time period. In this way, minimum bandwidth requirements and/or latency requirements may be met. In another example, for each TDM cycle, time slots may be allocated first to the ONT 808 based on information from the BBU regarding bandwidth, timing and/or latency requirements, before time slots are allocated to the other ONTs.

In some examples, therefore, the BBU 816 decides the timing information for the BS or RRU 812 based on signals to be transmitted or expected to be transmitted, and/or signals to be received or expected to be received. The timing information is communicated to the OLT so that the OLT can assign appropriate time slots to the ONT 808.

Figure 9:
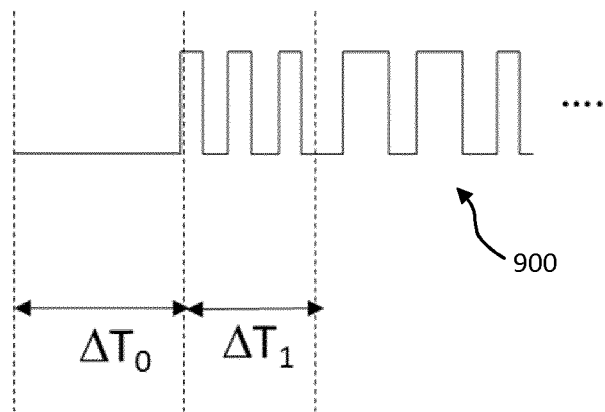
FIG. 9 illustrates an example of a portion of a still further optical signal.

In some embodiments of this disclosure, an upstream communication from a transmitter such as an ONT to a receiver such as an OLT may conform to a particular format. FIG. 9 shows an example of such a format of a signal 900. For a first time period (designated $\Delta_{T0}$) at the start of a time slot assigned to an ONT, the ONT transmits a sequence of zeros. In the event of an overlap between the transmitted signal 900 and a signal transmitted by another ONT (including the auxiliary ONT) in the previous time slot, there is no interference between the signals. For example, the time period $\Delta_{T0}$ is sufficiently long to enable the auxiliary ONT to stop inserting a signal or to operate an optical switch to stop the signal being inserted. Subsequently, in a second time period (designated $\Delta T_1$) the ONT transmits a start-of-frame word allowing the OLT to recognize that the ONT is starting to transmit. In some examples, the start-of-frame word may comprise a plurality of "1" bits or a predetermined bit sequence. In some aspects, the start-of-frame word of a regular ONT (i.e. not the auxiliary ONT) is made long enough that when real data is subsequently transmitted upstream by the ONT, the auxiliary ONT has stopped transmission or is no longer connected to OLT. As such, collisions can occur only during the start-of-frame word, which is acceptable. After the end of the second time period, the ONT may transmit user data.

In some aspects, some 0 bits are always transmitted by the auxiliary OLT at the end of its time slot. Thus, the auxiliary ONT stops transmitting before the end of the time slot, to avoid collisions with bits of a real ONT in a subsequent time slot. In some aspects, the ONTs use either of the first and second time periods, none or both of the first and second time periods.

Figure 10:
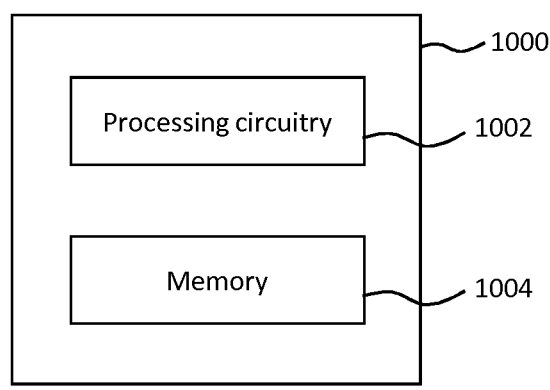
FIG. 10 is a schematic illustration of an apparatus for receiving an optical signal.
Figure 11:
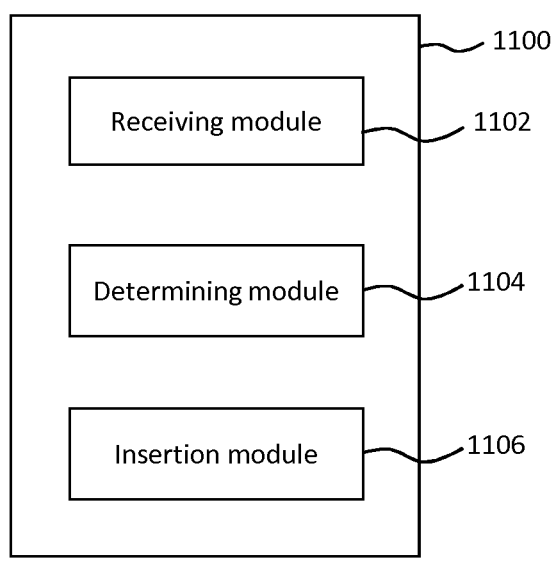
FIG. 11 is a schematic illustration of another apparatus for receiving an optical signal.

FIG. 10 shows an example of apparatus 1000 according to embodiments of the disclosure. The apparatus 1000 may be an apparatus for receiving an optical signal. The apparatus 1000 may be configured to perform the method of FIG. 5 or any example.

The apparatus 1000 comprises processing circuitry 1002 (e.g. a processor) and a memory 1004 in communication with the processing circuitry 1002. The memory 1004 contains instructions executable by the processor 1002. The apparatus 1000 also comprises an interface 1006 in communication with the processing circuitry 1002. The interface 1006 is arranged to provide for an optical connection with one or more ONTs and/or an optical, electrical or other communication with another network entity, e.g. a BBU.

The interface 1006, processing circuitry 1002 and memory 1004 are connected in any suitable way, for example via a bus.

In one embodiment, the memory 1004 containing instructions executable by the processor 1002 such that the apparatus is operable to is operable to: receive a first optical signal comprising time division multiplexed transmissions from a plurality of optical transmitters; determine that a transmission is not received during a time period from a first optical transmitter of the optical transmitters that is scheduled to transmit during the time period; and insert a second optical signal into the first optical signal during the time period, the second optical signal comprising at least a non-zero power portion.

FIG. 10 shows an example of an apparatus 1100 for receiving an optical signal. The apparatus 1100 comprises a receiving module 1102 configured to receive a first optical signal comprising time division multiplexed transmissions from a plurality of optical transmitters, and a determining module 1104 configured to determine that a transmission is not received during a time period from a first optical transmitter of the optical transmitters that is scheduled to transmit during the time period. The apparatus 1100 also comprises an insertion module 1106 configured to insert a second optical signal into the first optical signal during the time period, the second optical signal comprising at least a non-zero power portion.

Other embodiments of this disclosure may include a method of time division multiplexed communication with a plurality of optical network terminals (ONTs). This method comprises allocating a respective time slot for each of a plurality of optical network terminals, and communicating with each of the optical network terminals in its respective time slot. A first optical network terminal of the optical network terminals is associated with a base station or a remote radio unit, and allocating a respective time slot for each of the optical network terminals comprises allocating a time slot for the first optical network terminal based on timing information for signals transmitted or received by the base station or remote radio unit. In some examples, the timing information may be obtained from a base band unit (BBU).

Still further embodiments of this disclosure may include a method of receiving an optical signal. The method comprises receiving a first optical signal comprising time division multiplexed transmissions from a plurality of optical transmitters, and determining a respective received power level of each of the transmissions from each of the optical transmitters. A signal is sent to at least one of the optical transmitters to modify its transmission power such that the received power levels of transmissions received from the optical transmitters are within a predetermined range.

It should be noted that the above-mentioned examples illustrate rather than limit the invention, and that those skilled in the art will be able to design many alternative examples without departing from the scope of the appended statements. The word "comprising" does not exclude the presence of elements or steps other than those listed in a claim, "a" or "an" does not exclude a plurality, and a single processor or other unit may fulfil the functions of several units recited in the statements below. Where the terms, "first", "second" etc. are used they are to be understood merely as labels for the convenient identification of a particular feature. In particular, they are not to be interpreted as describing the first or the second feature of a plurality of such features (i.e. the first or second of such features to occur in time or space) unless explicitly stated otherwise. Steps in the methods disclosed herein may be carried out in any order unless expressly otherwise stated. Any reference signs in the statements shall not be construed so as to limit their scope.

The invention claimed is:

1. A method of receiving an optical signal, the method comprising:
   receiving a first optical signal comprising time division multiplexed transmissions from a plurality of optical transmitters;
   determining that a transmission is not received during a time period from a first optical transmitter of the optical transmitters that is scheduled to transmit during the time period, the determining including:
      listening for a preamble from the first optical transmitter during the time period; and
      determining that the transmission is not received if the preamble is not detected; and
   inserting a second optical signal into the first optical signal during the time period, the second optical signal comprising at least a non-zero power portion.

2. The method of claim 1, further comprising:
   allocating a respective time slot for each of the optical transmitters,
   wherein receiving a first optical signal comprises receiving a transmission from each of the optical transmitters in its respective time slot, and wherein the time period comprises a time slot of one of the first optical transmitters.

3. The method of claim 1, wherein the first optical transmitter is associated with one of a base station and a remote radio unit, and allocating a respective time slot for each of the optical transmitters comprises allocating a time slot for the first optical transmitter based on timing information for signals at least one of:
   one of transmitted and received by the one of the base station and the remote radio unit; and
   one of signals to be transmitted and to be received by the one of the base station and the remote radio unit.

4. The method of claim 2, wherein allocating a respective time slot for each of the optical transmitters comprises at least one of:
   allocating at least a minimum number of time slots to the first optical transmitter during each recurring time period, each recurring time period being a cycle of a plurality of cycles of the time division multiplexed transmissions;
   allocating at least a minimum bandwidth to the first optical transmitter during each recurring time period; and
   allocating at least one predetermined time slot to the first optical transmitter during each recurring time period.

5. The method of claim 1, further comprising:
   determining a respective received power level of each of the transmissions from each of the optical transmitters; and
   sending a signal to at least one of the optical transmitters to modify its transmission power such that the received power levels of transmissions received from the optical transmitters are within a predetermined range.

6. The method of claim 1, wherein the second optical signal is a variable optical signal corresponding to a predetermined bit pattern.

7. The method of claim 1, further comprising:
   stopping inserting the second optical signal into the first optical signal at the end of the time period.

8. The method of claim 1, wherein an end portion of the second optical signal during the time period comprises a portion of zero power over a plurality of symbol periods.

9. The method of claim 1, wherein inserting the second optical signal into the first optical signal comprises:
generating the second optical signal; and
switching the second optical signal into the first optical signal during the time period.

10. An apparatus for receiving an optical signal, the apparatus comprising a receiving module, an insertion module, a processor in communication with the receiving module and the insertion module, and a memory, the memory containing instructions executable by the processor such that the apparatus is configured to:
cause the receiving module to receive a first optical signal comprising time division multiplexed transmissions from a plurality of optical transmitters;
determine that a transmission is not received during a time period from a first optical transmitter of the optical transmitters that is scheduled to transmit during the time period, the determining including:
listening for a preamble from the first optical transmitter during the time period; and
determining that the transmission is not received if the preamble is not detected; and
cause the inserting module to insert a second optical signal into the first optical signal during the time period, the second optical signal comprising at least a non-zero power portion.

11. The apparatus of claim 10, wherein the memory contains instructions executable by the processor such that the apparatus is configured to:
allocate a respective time slot for each of the optical transmitters,
wherein receiving a first optical signal comprises receiving a transmission from each of the optical transmitters in its respective time slot, and wherein the time period comprises a time slot of one of the first optical transmitters.

12. The apparatus of claim 10, wherein the first optical transmitter is associated with one of a base station and a remote radio unit, and allocating a respective time slot for each of the optical transmitters comprises allocating a time slot for the first optical transmitter based on timing information for signals at least one of:
one of transmitted and received by the one of the base station and the remote radio unit; and
one of signals to be transmitted and to be received by the one of the base station and the remote radio unit.

13. The apparatus of claim 11, wherein allocating a respective time slot for each of the optical transmitters comprises at least one of:
allocating at least a minimum number of time slots to the first optical transmitter during each recurring time period, each recurring time period being a cycle of a plurality of cycles of the time division multiplexed transmissions;
allocating at least a minimum bandwidth to the first optical transmitter during each recurring time period; and
allocating at least one predetermined time slot to the first optical transmitter during each recurring time period.

14. The apparatus of claim 10, wherein the memory contains instructions executable by the processor such that the apparatus is further configured to:
determine a respective received power level of each of the transmissions from each of the optical transmitters; and
send a signal to at least one of the optical transmitters to modify its transmission power such that the received power levels of transmissions received from the optical transmitters are within a predetermined range.

15. The apparatus of claim 10, wherein the second optical signal is a variable optical signal corresponding to a predetermined bit pattern.

16. The apparatus of claim 10, wherein the memory contains instructions executable by the processor such that the apparatus is further configured to:
stop inserting the second optical signal into the first optical signal at the end of the time period.

17. The apparatus of claim 16, wherein an end portion of the second optical signal during the time period comprises a portion of zero power over a plurality of symbol periods.

18. The apparatus of claim 10, wherein inserting the second optical signal into the first optical signal comprises:
generating the second optical signal; and
switching the second optical signal into the first optical signal during the time period.

* * * * *